US009751392B2

(12) United States Patent
Choi

(10) Patent No.: US 9,751,392 B2
(45) Date of Patent: Sep. 5, 2017

(54) HYBRID POWERTRAIN

(71) Applicant: HYUNDAI MOTOR COMPANY, Seoul (KR)

(72) Inventor: Yeong Il Choi, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 241 days.

(21) Appl. No.: 14/697,517

(22) Filed: Apr. 27, 2015

(65) Prior Publication Data

US 2016/0144703 A1 May 26, 2016

(30) Foreign Application Priority Data

Nov. 26, 2014 (KR) ........................ 10-2014-0166513

(51) Int. Cl.
| | |
|---|---|
| *F16H 3/08* | (2006.01) |
| *F16H 37/06* | (2006.01) |
| *B60K 6/48* | (2007.10) |
| *B60K 6/40* | (2007.10) |
| *B60K 6/442* | (2007.10) |
| *B60K 6/36* | (2007.10) |
| *B60K 6/445* | (2007.10) |
| *B60K 6/547* | (2007.10) |
| *F16H 3/00* | (2006.01) |

(52) U.S. Cl.
CPC .................. *B60K 6/40* (2013.01); *B60K 6/36* (2013.01); *B60K 6/442* (2013.01); *B60K 6/445* (2013.01); *B60K 6/48* (2013.01); *B60K 6/547* (2013.01); *B60K 2006/4816* (2013.01); *F16H 3/006* (2013.01); *Y02T 10/6221* (2013.01); *Y02T 10/6234* (2013.01); *Y02T 10/6239* (2013.01); *Y02T 10/6256* (2013.01); *Y10S 903/912* (2013.01); *Y10S 903/951* (2013.01)

(58) Field of Classification Search
CPC .. F16H 3/006; F16H 2003/0931; F16H 3/091; F16H 47/02
USPC ........................... 74/330, 331, 333, 340, 661
See application file for complete search history.

(56) References Cited

U.S. PATENT DOCUMENTS

| | | | |
|---|---|---|---|
| 7,121,164 B2 | 10/2006 | Hanyu et al. | |
| 7,625,311 B2* | 12/2009 | Dilzer ...................... | B60K 6/40 477/5 |
| 8,608,615 B2* | 12/2013 | Fuechtner ................ | B60K 6/48 477/3 |
| 8,863,618 B2* | 10/2014 | Kubo ....................... | B60K 6/48 74/661 |
| 8,979,704 B2* | 3/2015 | Kaltenbach ............ | B60K 6/387 180/65.7 |

(Continued)

FOREIGN PATENT DOCUMENTS

| | | |
|---|---|---|
| JP | 2005-145145 A | 6/2005 |
| JP | 2009-036354 A | 2/2009 |

(Continued)

*Primary Examiner* — Ha D Ho
(74) *Attorney, Agent, or Firm* — McDermott Will & Emery LLP

(57) ABSTRACT

A hybrid power-train includes an input shaft connected to an engine and an output shaft disposed in parallel with the input shaft. A motor is connected to the input shaft and the output shaft. A drive mechanism connects the engine, the motor, and the output shaft. A plurality of clutches are operable for coupling and releasing, respectively, to perform a mode conversion.

8 Claims, 8 Drawing Sheets

(56) References Cited

U.S. PATENT DOCUMENTS

| | | | |
|---|---|---|---|
| 9,302,576 | B2 | 4/2016 | Ohashi et al. |
| 2001/0050190 | A1* | 12/2001 | Takenaka ............... B60K 6/365 180/65.235 |
| 2005/0209760 | A1 | 9/2005 | Tabata et al. |
| 2009/0069965 | A1 | 3/2009 | Tabata et al. |
| 2009/0069966 | A1 | 3/2009 | Tabata et al. |
| 2009/0075774 | A1 | 3/2009 | Tabata et al. |
| 2011/0028262 | A1 | 2/2011 | Yamamoto et al. |
| 2014/0162824 | A1 | 6/2014 | Choi et al. |

FOREIGN PATENT DOCUMENTS

| | | |
|---|---|---|
| JP | 2010-115943 A | 5/2010 |
| JP | 2014-054937 A | 3/2014 |
| KR | 10-0887204 B1 | 3/2009 |
| KR | 10-2011-0013241 A | 2/2011 |
| KR | 10-2014-0080638 A | 7/2014 |

\* cited by examiner

HYBRID POWERTRAIN

CROSS-REFERENCE TO RELATED APPLICATION

This application is based on and claims the benefit of priority to Korean Patent Application No. 10-2014-0166513, filed on Nov. 26, 2014 in the Korean Intellectual Property Office, the disclosure of which is incorporated herein in its entirety by reference.

TECHNICAL FIELD

The present disclosure relates to a hybrid powertrain, and more particularly, to a hybrid powertrain capable of saving costs, improving efficiency, and effectively implementing various multi modes with one motor.

BACKGROUND

A hybrid vehicle is driven by combining two different power sources, for example, an engine torque by combusting fuel (fossil fuel such as gasoline) and a motor torque by battery power.

The hybrid vehicle uses an engine and an electric motor as an auxiliary power source to reduce exhaust gas and enhance fuel efficiency. Studies on the hybrid vehicle have been actively conducted to meet the demands of enhancing fuel efficiency and developing environmentally-friendly products.

The hybrid vehicle generally uses a motor having relatively low-speed torque characteristics at a low speed as a main power source and uses an engine having relatively high-speed torque characteristics at a high speed as a main power source.

Therefore, the hybrid vehicle stops the engine at a low speed section and operates the motor, and therefore improving fuel efficiency and reducing exhaust gas.

FIG. 1 is a diagram illustrating an example of a hybrid power-train according to the related art, which includes an engine 1, a first motor MG1, and a second motor MG2.

The first motor MG1 serves as a generator which generates power by a driving force of an engine 1, and the second motor is directly connected to an output shaft 4 to implement an electric vehicle (EV) mode.

An input shaft 2 which is connected to the engine 1 is provided with an over drive clutch 3. The over drive clutch 3 directly connects the input shaft 2 to the output shaft 4 to implement a high efficiency point operation of an engine at the time of the high speed driving of the vehicle and is in a released operation state at normal times.

According to the related art, since the second motor MG2 is connected to the output shaft 4 via two pairs of gears, efficiency of the EV mode is increased, and thus, fuel efficiency of plug-in hybrid electric vehicle charge depleting (PHEV CD) is excellent.

However, as all the driving forces of the engine at the time of driving a vehicle in a hybrid electric vehicle (HEV) mode are transferred to the first motor MG1 and are output via the second motor (MG2) after the first motor MG1 generates power, conversion losses of mechanical energy and electrical energy occur, and therefore, the fuel efficiency of plug-in hybrid electric vehicle charge sustaining (PHEV CS) significantly decreases. Further, since the two motors MG1 and MG2 are used, the hybrid power-train according to the related art is expensive.

FIG. 2 is a diagram illustrating another example of a hybrid power-train according to the related art, which includes an engine 1, first and second planetary gear sets PG1 and PG2, a first motor MG1, and a second motor MG2.

The first motor MG1 as a generator is connected to the input shaft 2 of the engine 1 through the first planetary gear set PG1 to receive a driving force of the engine 1.

The second motor MG2 is directly connected to the output shaft 4 through the second planetary gear set PG2 and a pair of gears to implement the EV mode.

According to the related art of another example as described above, the driving force is transferred via the planetary gear set PG1 and the two pairs of gear at the time of EV driving. Thus, transfer efficiency is relatively reduced and the driving force of the engine is branched through the planetary gear set PG2, and therefore, the energy conversion loss is reduced. However, a power generation operation is performed by using the first motor MG1 and therefore the efficiency thereof is low. Further, since two motors such as the first and second motors MG1 and MG2 are used, the hybrid power-train according to the related art is expensive.

SUMMARY

The present disclosure has been made to solve the above-mentioned problems occurring in the prior art while advantages achieved by the prior art are maintained intact.

An aspect of the present disclosure provides a hybrid power-train capable of saving costs, improving efficiency, and minimizing a loss of transfer efficiency and effectively implementing various multi modes, such as a high-efficiency EV mode, a parallel HEV mode, a serial mode, and a direct connection mode, to meet various driving conditions, by applying one motor.

According to an exemplary embodiment of the present inventive concept, a hybrid power-train includes an input shaft connected to an engine and an output shaft disposed in parallel with the input shaft. A motor is connected to the input shaft and the output shaft. A drive mechanism connects the engine, the motor, and the output shaft. A plurality of clutches are operable for coupling and releasing, respectively, to perform a mode conversion.

The drive mechanism may have a first power transfer part drivably connecting the input shaft and the motor. A second power transfer part drivably connects the input shaft and the output shaft, and a third power transfer part drivably connects the motor and the output shaft.

The plurality of clutches may include a first clutch in the first power transfer part, a second clutch in the second power transfer part, and a third clutch in the third power transfer part.

According to another exemplary embodiment of the present inventive concept, a hybrid power-train includes an input shaft connected to an engine and an output shaft disposed in parallel with the input shaft. A motor is connected to the input shaft and the output shaft. A first transfer shaft is branched from the input shaft. A second transfer shaft is branched from the input shaft and installed in parallel with the first transfer shaft. A motor driving shaft connects the motor and the first transfer shaft. A third transfer shaft is drivably connected to the motor driving shaft. A first clutch is installed in the first transfer shaft. A second clutch is installed in the second transfer shaft. A third clutch is installed in the third transfer shaft.

The input shaft may have a branch drive part. A driving force of the input shaft may be transferred to the first and second transfer shaft by the branch drive part.

The first and second transfer shafts may be branched in parallel with the input shaft by the branch drive part.

The first transfer shaft may be connected to the motor driving shaft.

The second transfer shaft may be connected to the output shaft.

The third transfer shaft may be connected to the motor driving shaft and the output shaft.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
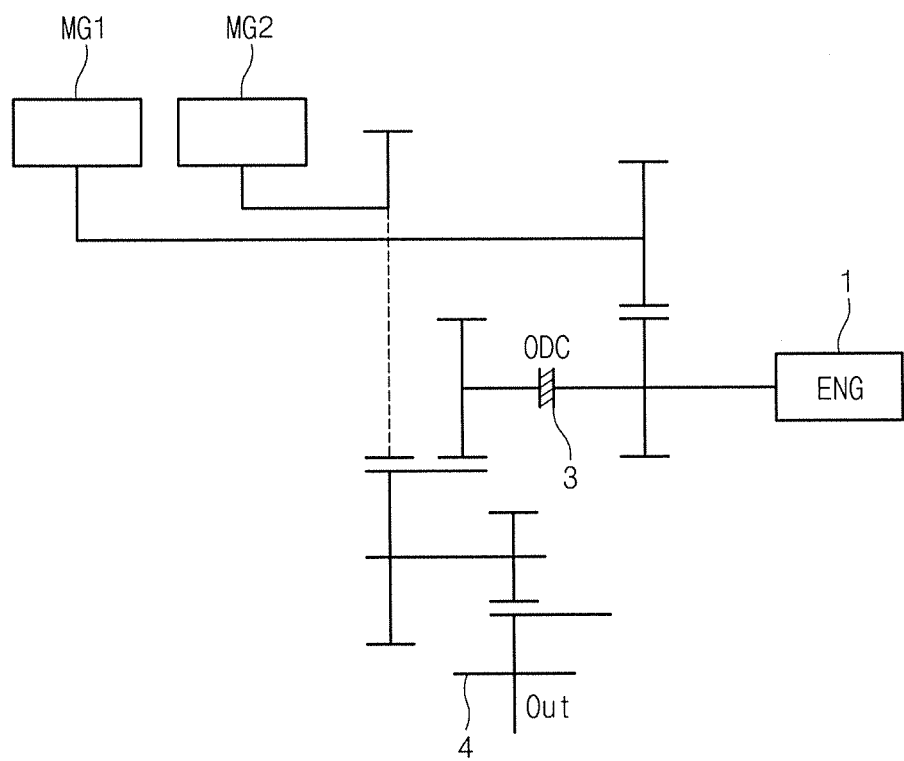
FIG. 1 is a configuration diagram illustrating an example of a hybrid power-train according to the related art.
Figure 2:
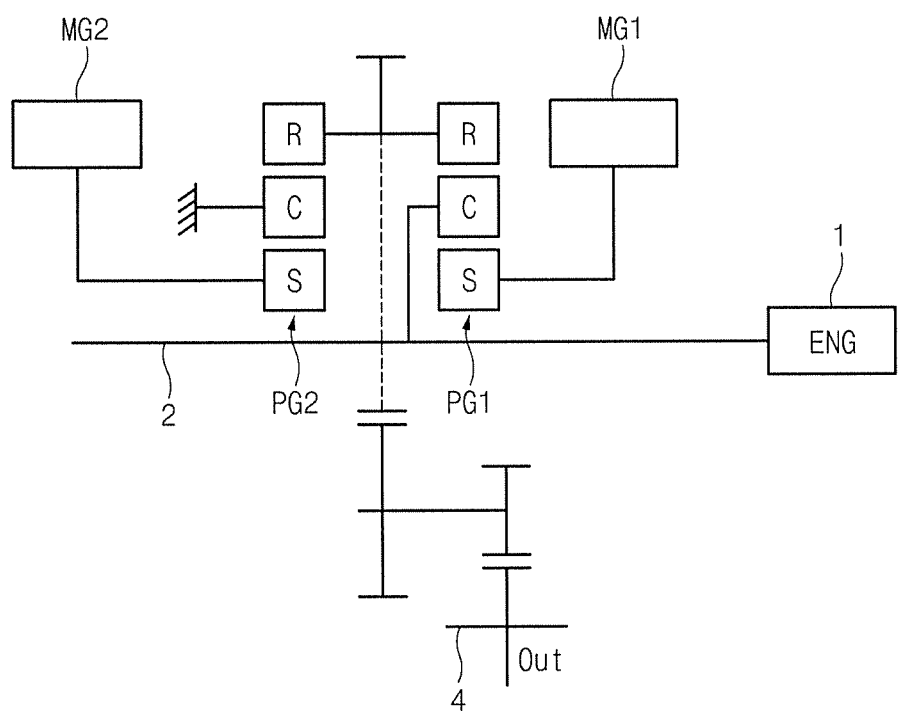
FIG. 2 is a configuration diagram illustrating another example of a hybrid power-train according to the related art.

Hereinafter, embodiments of the present inventive concept will be described in detail with reference to the accompanying drawings. For reference, a size of components, a thickness of a line, and the like which are illustrated in the drawing referenced for describing exemplary embodiments may be slightly exaggerated for convenience of understanding. Further, terms used to describe the present disclosure are defined in consideration of functions in the present disclosure and therefore may be changed depending on a user, an intention an operator, a practice, and the like. Therefore, the definition of the terminologies should be construed based on the contents throughout the specification.

Figure 3:
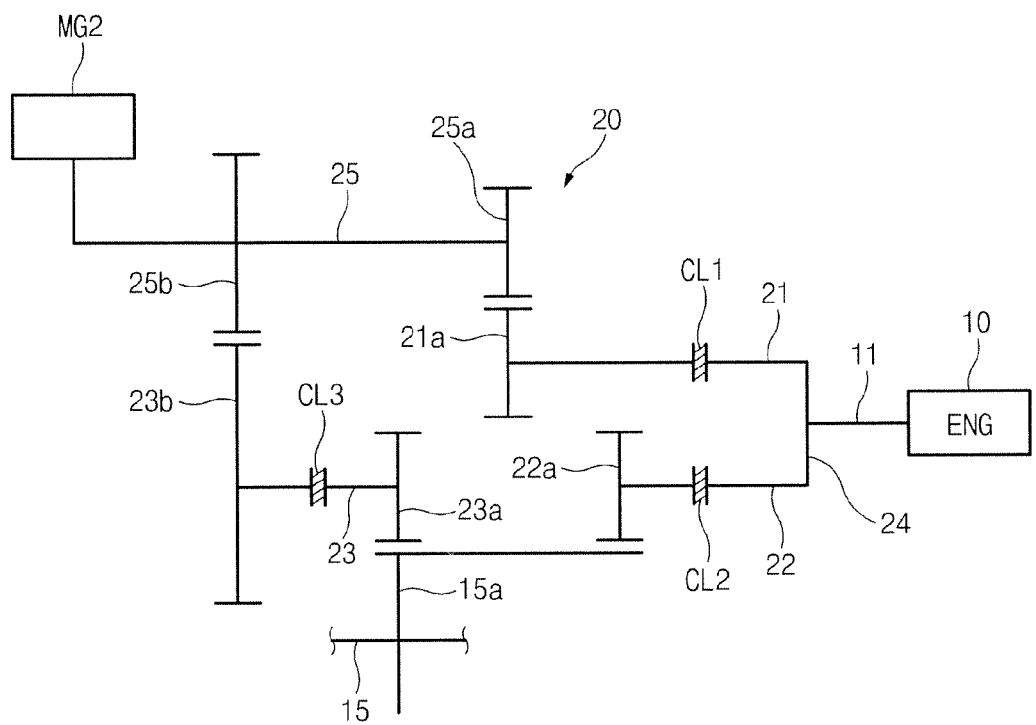
FIG. 3 is a configuration diagram illustrating a hybrid power-train according to an exemplary embodiment of the present inventive concept.

As illustrated in FIG. 3, a hybrid power-train according to an embodiment includes an input shaft 11 connected to an engine 10, an output shaft 15 disposed to be parallel with the input shaft 11, and a motor MG connected to the input shaft 11 and the output shaft 15. A drive mechanism 20 is connected among the engine 10, the motor MG, and the output shaft 15 and includes a plurality of clutches CL1, CL2, and CL3 installed therein.

The input shaft 11 is installed in a train housing (not shown), and one side of the input shaft 11 is connected to the engine 10 to receive a driving force of the engine 10.

Another side of the input shaft 11 is connected to the output shaft 15 and the motor MG via the drive mechanism 20.

The output shaft 15 is disposed to be parallel with the input shaft 11 and drives a vehicle wheel (not shown) and the output shaft 15.

The motor MG is connected to the input shaft 11 and the output shaft 15. The motor MG serves as a generator generating power by the driving force of the engine 10 and serves as a motor generating the driving force and supplying the generated driving force to the output shaft 15.

The drive mechanism 20 includes a first power transfer part drivably connecting between the input shaft 11 and the motor MG, a second power transfer part drivably connecting between the input shaft 11 and the output shaft 15 to transfer power therebetween, and a third power transfer part drivably connecting between the motor MG and the output shaft 15.

The first power transfer part includes a first transfer shaft 21 which is branched from the input shaft 11 toward the motor MG. The second power transfer part includes a second transfer shaft 22 which is branched from the input shaft 11 toward the output shaft 15. The third power transfer part has a third transfer shaft 23 which is disposed in parallel with the first and second transfer shafts 21 and 22 between the motor MG and the output shaft 15.

The first transfer shaft 21 and the second transfer shaft 22 are parallel to each other, and in particular, the first transfer shaft 21 and the second transfer shaft 22 are branched in parallel with the input shaft 11 through a branch drive part 24.

The branch drive part 24 is installed at the other side of the input shaft 11 and thus branches the driving force of the input shaft 11 to the first and second transfer shafts 21 and 22 to be driven. The branch drive part 24 may have various structures to appropriately branch the driving force of the input shaft 11 such as a gear drive mechanism, a chain drive mechanism, or the like.

A motor driving shaft 25 is connected between the motor MG and the first transfer shaft 21. The motor driving shaft 25 is drivably connected to the first transfer shaft 21, and the third transfer shaft 23 is drivably connected to the motor driving shaft 25.

The first transfer shaft 21 has a first transfer gear 21a, the motor driving shaft 25 has a first driving gear 25a and a second driving gear 25b, the second transfer shaft 22 has a second transfer gear 22a, and the third transfer shaft 23 has a third transfer gear 23a and a fourth transfer gear 23b.

The first transfer shaft 21 is connected to the motor driving shaft 25 by a gear drive. That is, the first transfer gear 21a of the first transfer shaft 21 meshes with the first driving gear 25a of the motor driving shaft 25, and thus, the first transfer shaft 21 and the motor driving shaft 25 are connected to each other to be mutually driven. As such, the drivable connection between the first transfer shaft 21 and the motor driving shaft 25 configures a first power transfer part.

The second transfer shaft 22 is connected to the output shaft 15 by the gear drive. That is, the second transfer gear 22a of the second transfer shaft 22 meshes with a driving gear 15a of the output shaft 15, and thus, the second transfer shaft 22 and the output shaft 15 are connected to each other to be mutually driven, and the drivable connection between the second transfer shaft 22 and the output shaft 15 configures a second power transfer part.

The third transfer shaft 23 is connected to the motor driving shaft 25 and the output shaft 15 by the gear drive. That is, the fourth transfer gear 23b of the third transfer shaft 23 meshes with the second driving gear 25b of the motor driving shaft 25, and thus, the third transfer shaft 23 and the motor driving shaft 25 are connected to each other to be mutually driven. The third transfer gear 23a of the third transfer shaft 23 meshes with the driving gear 15a of the output shaft 15, and thus, the third transfer shaft 23 and the output shaft 15 are connected to each other to be mutually driven. The drivable connection among the motor driving shaft 25, the third transfer shaft 23, and the output shaft 15 configures the third power transfer part.

A first clutch CL1 is installed in the middle of the first transfer shaft 21 and controls a power transfer between the engine 10 and the motor MG.

A second clutch CL2 is installed in the middle of the second transfer shaft 22 and controls a power transfer between the engine 10 and the output shaft 15.

A third clutch CL3 is installed in the middle of the third transfer shaft 23 and controls a power transfer between the motor MG and the output shaft 15.

The coupling and release operations of the plurality of clutches CL1, CL2, and CL3 are performed selectively, and the plurality of clutches CL1, CL2, and CL3 may effectively implement various multi modes such as a high efficiency EV mode, a parallel HEV mode, a serial mode, and a direct connection mode to meet various driving conditions.

The multi-mode state of the hybrid power-train according to the exemplary embodiment as described above will be described with reference to FIGS. 4 to 8.

Figure 4:
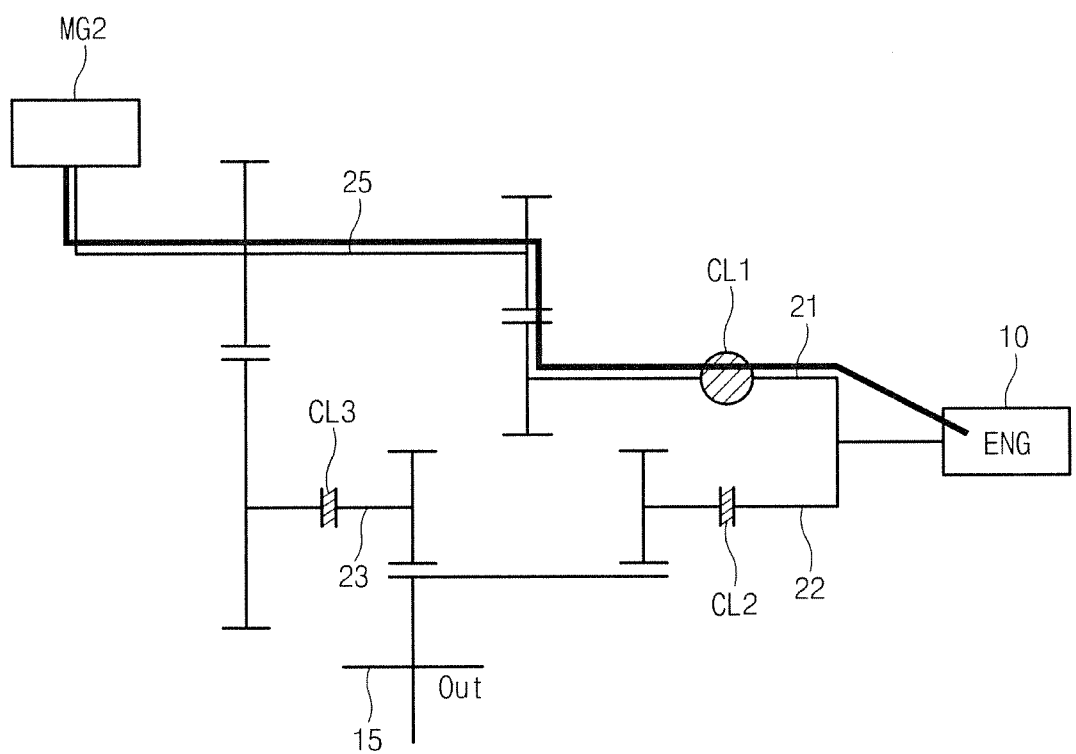
FIG. 4 is a diagram illustrating a power transfer system in starting/N stage charging mode of the hybrid power-train according to the exemplary embodiment of the present inventive concept.

For a starting/N-stage charging mode, as illustrated in FIG. 4, power is transferred between the motor MG and the engine 10 through the release operations of the second and third clutches CL2 and CL3 and the coupling operation of the first clutch CL1 independent of a state of the vehicle.

Figure 5:
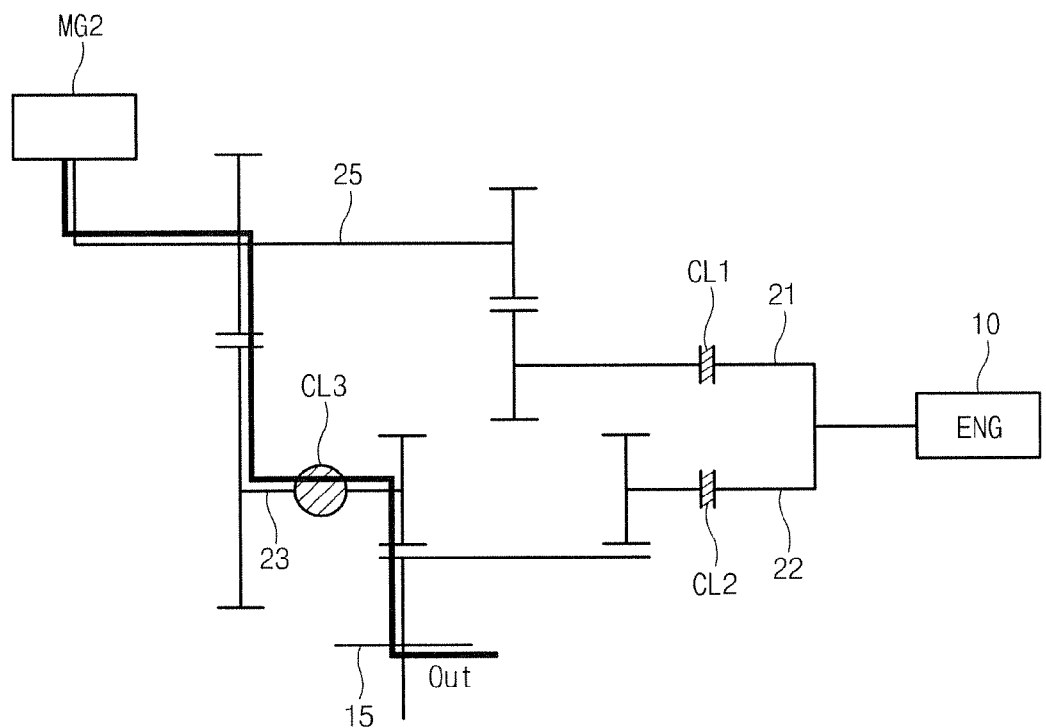
FIG. 5 is a diagram illustrating a power transfer system in EV/regenerative mode of the hybrid power-train according to the exemplary embodiment of the present inventive concept.

In the case of an EV/regenerative mode, as illustrated in FIG. 5, the driving force of the motor MG is transferred to the output shaft 15 through the motor driving shaft 25 and the third transfer shaft 23 by the release operations of the first and second clutches CL1 and CL2 and the coupling operation of the third clutch CL3.

Figure 6:
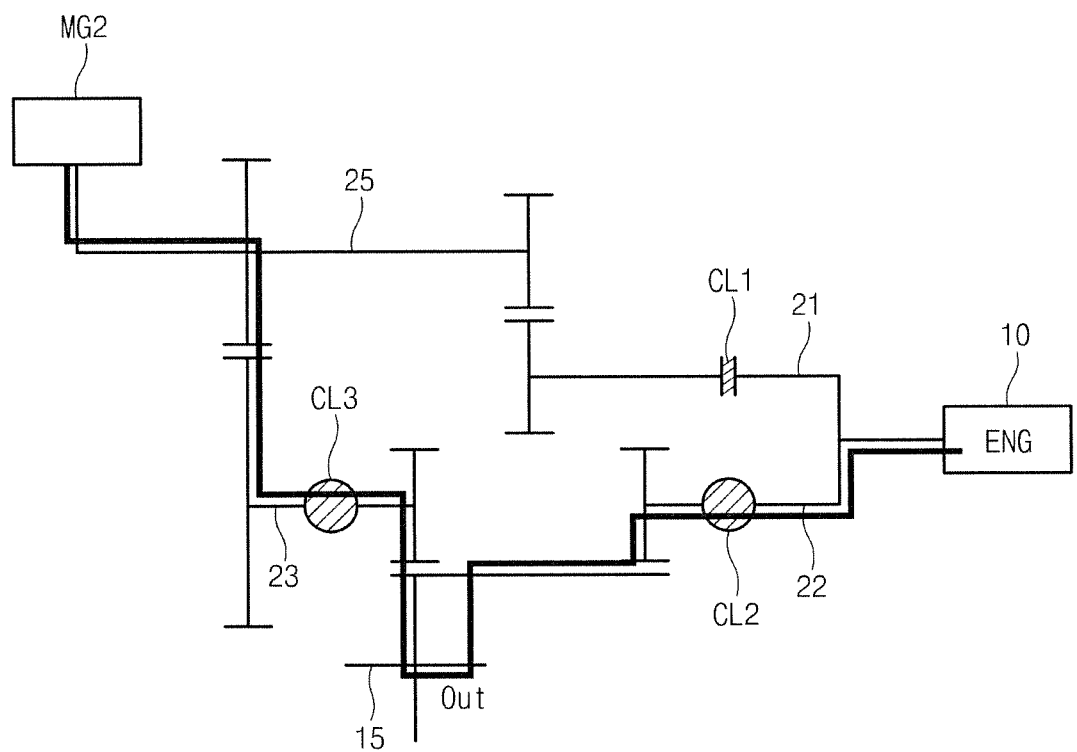
FIG. 6 is a diagram illustrating a power transfer system in an HEV mode (motor auxiliary power) of the hybrid power-train according to the exemplary embodiment of the present inventive concept.

In the case of an HEV mode in which the motor MG is used as auxiliary power, as illustrated in FIG. 6, the driving force of the engine 10 is transferred to the output shaft 15 through the second transfer shaft 22 and the driving force of the motor MG is transferred to the output shaft 15 through the third transfer shaft 23, by the release operation of the first clutch CL1 and the coupling operations of the second and third clutches CL2 and CL3.

Figure 7:
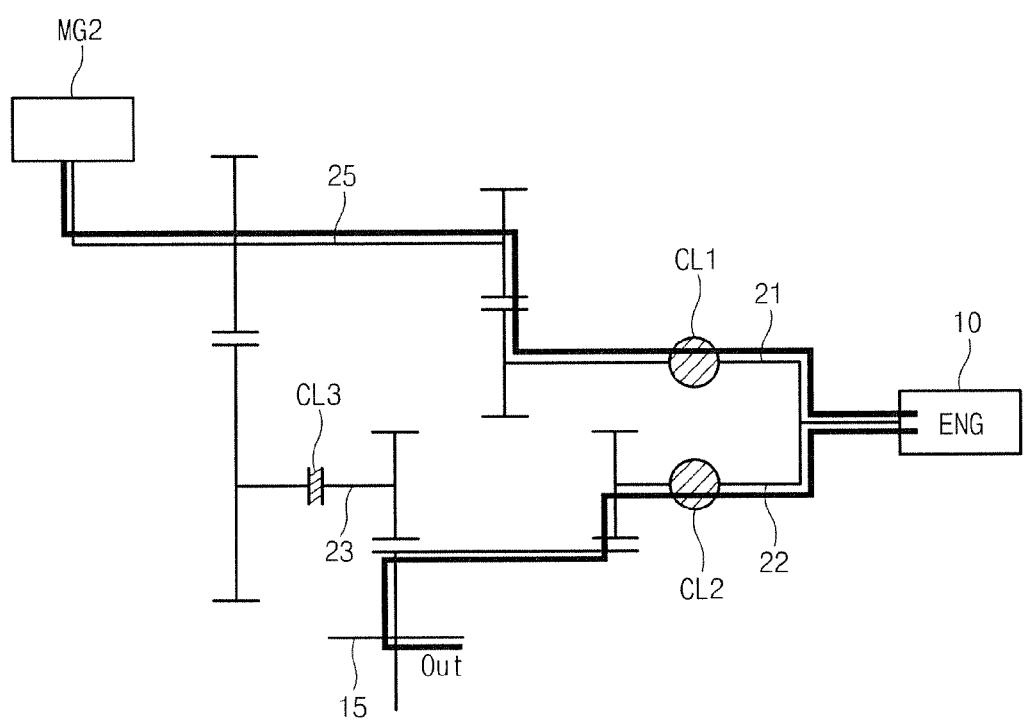
FIG. 7 is a diagram illustrating the power transfer system in an HEV mode (charging state of a motor) of the hybrid power-train according to the exemplary embodiment of the present inventive concept.

In the case of the HEV mode in which the motor MG is charged, as illustrated in FIG. 7, the driving force of the engine 10 is transferred to the output shaft 15 through the second transfer shaft 22 and some of the driving force of the engine 10 is transferred to the motor MG through the first transfer shaft 21 and the motor driving shaft 25, by the release operation of the third clutch CL3 and the coupling operations of the first and second clutches CL2 and CL3, thereby performing the power generation of the motor MG.

Figure 8:
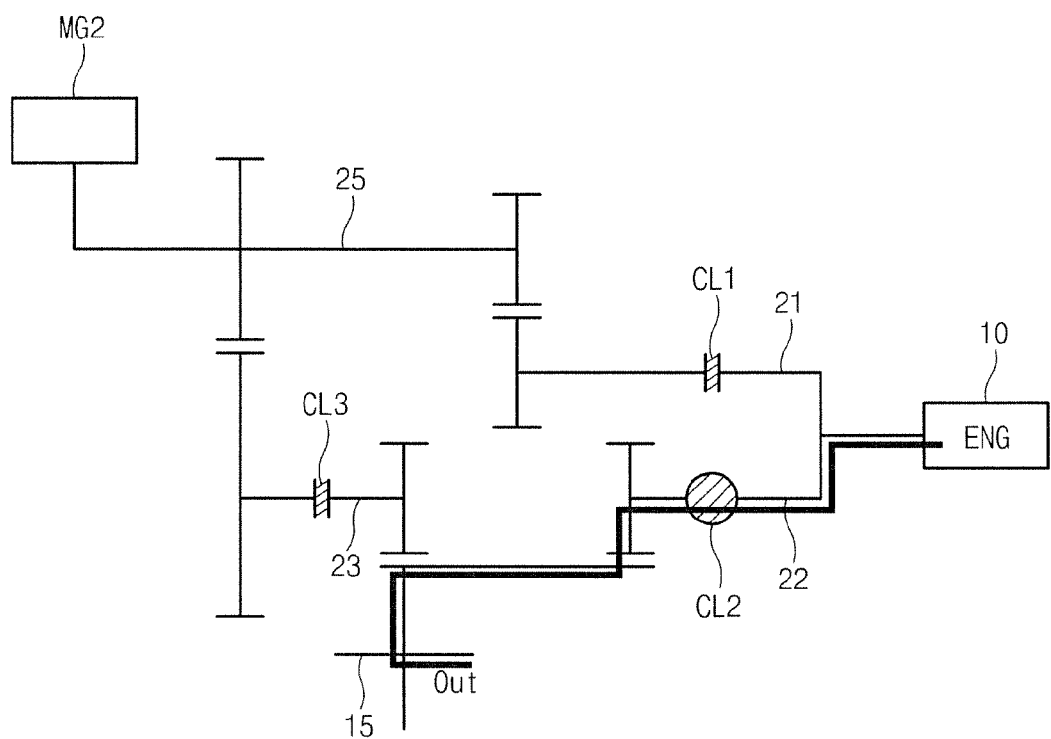
FIG. 8 is a diagram illustrating a power transfer system in an engine direct connection mode of the hybrid power-train according to the exemplary embodiment of the present inventive concept.

In the case of the direct connection mode of the engine, as illustrated in FIG. 8, the driving force of the engine 10 is transferred to the output shaft 15 through the second transfer shaft 22, by the release operations of the first and third clutches CL1 and CL3 and the coupling operation of the second clutch CL2.

As described above, according to the present disclosure, it is possible to save costs, improve fuel efficiency, minimize the loss of transfer efficiency, and effectively implement various multi modes, such as a high-efficiency EV mode, a parallel HEV mode, a serial mode, and a direct connection mode, to meet various driving conditions, by applying one motor.

Further, according to the present disclosure, it is possible to effectively implement the starting and the motor charging and the like at the time of an N stage charging mode (starting of the engine and driving and power generation of the motor) and an HEV mode by the first clutch which is installed in the first power transfer part between the engine and the motor, effectively implement the HEV mode (transfer the driving force by the engine) and the like by the second clutch which is installed in the second power transfer part between the engine and the output shaft, and effectively implement the EV mode, the regenerative mode, the HEV mode, and the like by the third clutch which is installed in the third power transfer part between the motor and the shaft output. That is, it is possible to effectively implement various multi modes such as the high efficiency EV mode, the parallel HEV mode, the serial mode, and the direct connection mode through the coupling, release, and the like of the first to third clutches.

Hereinabove, the exemplary embodiments of the present inventive concept are described but the present disclosure is not limited to the disclosed embodiments and the accompanying drawings and may be variously changed without departing from the spirit and the scope of the present disclosure.

What is claimed is:

1. A hybrid powertrain, comprising:
   an input shaft connected to an engine;
   an output shaft disposed in parallel with the input shaft;
   a motor connected to the input shaft and the output shaft;
   a drive mechanism connecting the engine, the motor, and the output shaft and having a plurality of clutches,
   wherein the plurality of clutches are being operable for coupling and releasing, respectively, to perform a mode conversion,
   wherein the drive mechanism has: a first power transfer part drivably connecting the input shaft and the motor; a second power transfer part drivably connecting the input shaft and the output shaft; and a third power transfer part drivably connecting the motor and the output shaft,
   wherein the first power transfer part includes a first transfer shaft which is branched from the input shaft toward the motor, the second power transfer part includes a second transfer shaft which is branched from the input shaft toward the output shaft, the third power transfer part has a third transfer shaft which is disposed in parallel with the first and second transfer shafts between the motor and the output shaft,
   wherein the first transfer shaft has a first transfer gear, the second transfer shaft has a second transfer gear, and the third transfer shaft has a third transfer gear and a fourth transfer gear, and
   wherein the first transfer gear of the first transfer shaft meshes with a first driving gear of a motor driving shaft, the second transfer gear of the second transfer shaft meshes with a driving gear of the output shaft, and the fourth transfer gear of the third transfer shaft meshes with a second driving gear of the motor driving shaft.

2. The hybrid power-train according to claim 1, wherein the plurality of clutches include a first clutch installed in the first power transfer part, a second clutch installed in the second power transfer part, and a third clutch installed in the third power transfer part.

3. A hybrid power-train, comprising:
an input shaft connected to an engine;
an output shaft disposed in parallel with the input shaft;
a motor connected to the input shaft and the output shaft;
a first transfer shaft branched from the input shaft;
a second transfer shaft branched from the input shaft and installed in parallel with the first transfer shaft;
a motor driving shaft connecting the motor and the first transfer shaft;
a third transfer shaft drivably connected to the motor driving shaft;
a first clutch in the first transfer shaft;
a second clutch in the second transfer shaft; and
a third clutch in the third transfer shaft;
wherein the first transfer shaft has a first transfer gear, the motor driving shaft has a first driving gear and a second driving gear, the second transfer shaft has a second transfer gear, and the third transfer shaft has a third transfer gear and a fourth transfer gear, and
wherein the first transfer gear of the first transfer shaft meshes with the first driving gear of the motor driving shaft, the second transfer gear of the second transfer shaft meshes with a driving gear of the output shaft, and the fourth transfer gear of the third transfer shaft meshes with the second driving gear of the motor driving shaft.

4. The hybrid power-train according to claim 3, wherein the input shaft has a branch drive part, and a driving force of the input shaft is transferred to the first and second transfer shaft by the branch drive part.

5. The hybrid power-train according to claim 4, wherein the first and second transfer shafts are branched in parallel with the input shaft by the branch drive part.

6. The hybrid power-train according to claim 3, wherein the first transfer shaft is connected to the motor driving shaft.

7. The hybrid power-train according to claim 3, wherein the second transfer shaft is connected to the output shaft.

8. The hybrid power-train according to claim 3, wherein the third transfer shaft is connected to the motor driving shaft and the output shaft.

* * * * *